United States Patent

3,830,890
Patented Aug. 20, 1974

3,830,890
METHOD OF MAKING ESTERS OF 1,4-DIPHOSPHONYL BUTENE
Al F. Kerst, Littleton, and Allen K. Peterson, Denver, Colo., assignors to The Gates Rubber Company, Denver, Colo.
No Drawing. Filed Mar. 30, 1971, Ser. No. 129,605
Int. Cl. C07f 9/40
U.S. Cl. 260—932                8 Claims

ABSTRACT OF THE DISCLOSURE

Esters of 1,4-diphosphonyl butene and their halogenated derivatives having the general formulas:

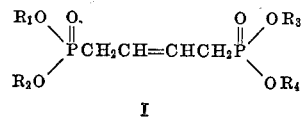

I

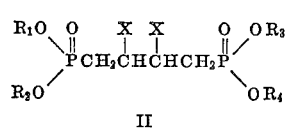

II wherein $R_1$, $R_2$, $R_3$ and $R_4$ are independently selected from the group consisting of alkyl, aryl, aralkyl, alkenyl, cycloalkyl, alkaline metal, and wherein X is a halogen selected from the group consisting of bromine, chlorine, or iodine, are useful flame-retardants for polymeric systems. Flame-retardant properties are also imparted by polymers of the above compounds. Representative polymers of compounds I and II would include:

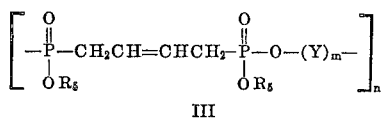

III

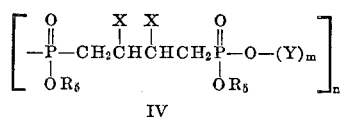

IV

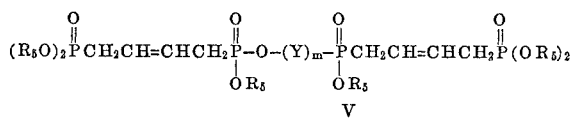

V

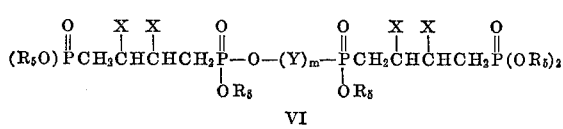

VI wherein $R_5$ is defined in the same manner as $R_1$, $R_2$, $R_3$, and $R_4$ above and wherein Y is

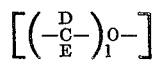

where C is carbon and D and E are independently selected from the group consisting of hydrogen, bromine, chlorine, alkyl or aryl and wherein $n$ is an integer less than 5,000, $l$ is an integer from 2 to 15 inclusive, and $m$ is an integer from 1 to 50 inclusive.

BACKGROUND OF THE INVENTION

(1) Field of the Invention

Organophosphorus esters have been used for some time to impart flame-retardant characteristics to polymeric systems. Many organophosphorus esters have also attracted attention because of desirable flame-retardant properties which make them useful, depending upon the particular compound, as synthetic lubricants and hydraulic fluids, as well as flame-retardants for textiles and other fabrics. As polymer flame-retardants, organophosphorus esters offer the advantages of being relatively inexpensive, and readily available. Furthermore, some types of organophosphorus esters can be used to prepare compounds having at least two types of the most effective flame-retarding elements in one compound, namely phosphorus and halogen. However, the advantages of using organophosphorus ester as flame-retardants have often been achieved at the expense of some of the desirable physical and chemical characteristics of many polymeric systems. Hence, there is a continuing interest in finding compounds which can impart flame-retardancy with minimum effects on the physical and chemical properties of polymers.

(2) Description of the Prior Art

The prior art teaches the uses of both unreactive and "built-in" or chemically bonded organophosphorus esters as flame-retardants for polymeric systems. Examples of unreactive organophosphorus ester additives would include the trialkyl phosphates such as triphenyl phosphate, tricresyl phosphate, and tris (2-chloroethyl) phosphate. Unfortunately, many low molecular weight organophosphorus molecules which are unreacted, that is, not chemically bonded to the polymer chain, suffer the disadvantages of being susceptible to loss by volatilization, by leaching of solvents or water, and by being squeezed out by pressure over a period of time. Many organophosphorus additives also have the additional disadvantages of being relatively difficult to halogenate and they often tend to over plasticize many polymer products.

Inventions concerned with chemically bonding reactive organophosphorus esters into a polymer's molecular structure have encountered other problems. Typically, chemical bonding involves the use of tris (hydroxalkyl) phosphite and phosphate esters as components in polyol reactant mixtures so that the phosphorus is chemically bonded into the polymer chain, e.g. as described in U.S. Pats. 3,009,939 and 3,061,625. The chief problems associated with chemically bonding phosphorus esters into polymeric systems have resulted from hydrolysis of chemically bonded phosphorus ester linkages and/or undesirably changes in the polymer's physical characteristics due to the high phosphorus concentrations which are inherently used in the chemical bonding techniques. When phosphorus esters are chemically bonded into the molecular structure of a polymer, there are generally greater possibilities for degradation of the entire polymer system if the repeating phosphorus ester units undergo undesirable reactions. Unfortunately, moisture often causes the hydrolysis of phosphorus ester linkages. This results in severe degradation of any polymer containing repeating phosphorus ester groups in its molecular structure. Another difficulty encountered with the chemical bonding techniques has been that phosphorus-containing polyols have often proved to be too viscous to be metered and pumped through the conventional equipment used to prepare polymers. Highly functional phosphorus ester polyols introduce an even higher risk of hydrolysis because they contain multiple phosphorus ester linkages.

Therefore, the chief objects of this invention are to provide suitable phosphorus ester compounds and suitable methods of preparing, halogenating and using these compounds to achieve flame-retardancy with less risk of degradation of the host polymeric system. The applicant has discovered that these objects are achieved when phosphorus and halogen are introduced into polymeric systems in the form of esters of 1,4-diphosphonyl butene and their halogenated derivatives. Preferably, these compounds are introduced into the polymeric system in substantially unreactive forms. The applicant has also discovered that flame-retardant objectives are particularly well achieved when high molecular weight polymers such as compounds III, IV, V and VI are employed. It should be noted however that although the polymers of esters 1,4-diphosphonyl butene are preferably introduced into polymeric systems in unreactive forms, there can be variations in preparative techniques hereinafter described which can be utilized to produce reactive forms if chemical bonding in a polymeric system should be desired.

SUMMARY

In accordance with the practice of this invention, it has been found that a novel class of compounds herein termed "esters of 1,4-diphosphonyl butene and their halogenated derivatives" can be used to impart flame-retardant characteristics to polymeric systems. These compounds may be represented by the general formulas:

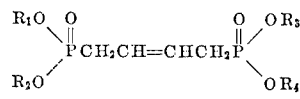

I

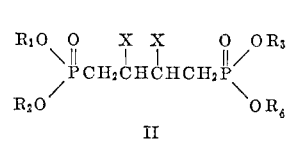

II wherein $R_1$, $R_2$, $R_3$ and $R_4$ are organic radicals independently selected from the group consisting of alkyl and substituted alkyl having from 1 to 20 carbon atoms, the more preferred of these having 1 to 11 carbon atoms; aryl and substituted aryl having from 6 to 25 carbon atoms, the more preferred of these having 6 to 15 carbon atoms; aralkyl and substituted aralkyl having from 7 to 20 carbon atoms, the more preferred of these having from 7 to 10 carbon atoms; alkenyl and substituted alkenyl having from 2 to 12 carbon atoms, the more preferred of these having from 2 to 6 carbon atoms; cycloalkyl and substituted cycloalkyl having from 3 to 15 carbon atoms, the more preferred of these having from 3 to 8 carbon atoms; and heterocyclic and substituted heterocyclic having from 1 to 15 carbon atoms, the more preferred of these having from 1 to 8 carbon atoms; hydrogen; alkaline metals selected from the group consisting of sodium, potassium or lithium; and wherein X is a halogen selected from the group consisting of bromine, chlorine or iodine.

The substituents present on the alkyl, aralkyl, aryl, alkenyl, cycloalkyl and heterocyclic radicals may be halogen, alkoxy, phenoxy, alkylphenyl, chlorophenyl, nitro, amino, substituted amino, cyano and the like. However, because of the undesirable tendency toward side reactions during preparation of the esters of 1,4-diphosphonyl butenes, the use of halogen substituents on $R_1$, $R_2$, $R_3$, and $R_4$ should be confined to the aryl groups. In the case of halogen substitution on aryl, $R_1$, $R_2$, $R_3$, and $R_4$ groups, the halogens are selected from the group consisting of fluorine, chlorine, bromine or iodine with said halogens being carried in the ortho, meta or para position on the aryl nucleus with respect to the attachment of said nucleus to the oxygen atom of the phosphate esters. The meta and para positions are, however, more preferred.

The applicant has discovered that esters of 1,4-diphosphonyl butene and their halogenated derivatives can be prepared in good yields by (1) a so-called Arbuzov reaction between a triorganic phosphite and a 1,4-dihalobutene, (2) the metathetical reaction between an alkali diorgano phosphite and a 1,4-dihalobutene or (3) a combination of the Arbuzov and alkali diorgano phosphite reactions. Those skilled in the art will recognize that although the Arbuzov and alkali diorgano phosphite reactions have been employed to make other organo phosphorus esters such as those found in U.S. Pats. 2,681,920; 2,634,288; and 3,256,370 these types of reactions have been limited to their particular types of reactants. In many cases these reactions have been applicable to the preparation of their desired products only with difficulty and in low yields. Therefore, the ease, cleanliness and high yields of the reactions of this invention are totally unexpected especially in view of the fact that some analogous reactions, particularly some of those aimed at producing certain alkylene diphosphonates, have sometimes failed to yield any of their intended products.

Briefly, the methods for preparing the esters of 1,4-diphosphonyl butene and their halogenated derivatives taught in this invention are illustrated by the following equations:

ARBUZOV METHOD

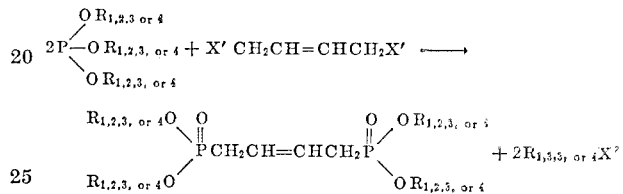

ALKALI DIORGANO PHOSPHITE METHOD

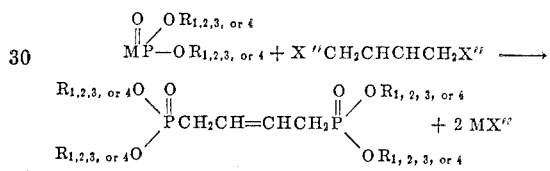

HALOGENATION REACTIONS

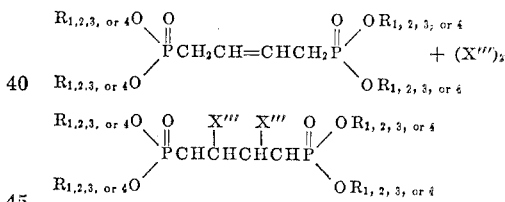

wherein $R_1$, $R_2$, $R_3$, and $R_4$ are independently defined in the same manner as $R_1$, $R_2$, $R_3$, or $R_4$ above, and wherein $X'$, $X''$, and $X'''$, are halogens selected from the group consisting of chlorine, bromine or iodine, and wherein M is an alkali metal selected from the group consisting of sodium, potassium or lithium.

Suitable triorganic phosphites which may be utilized in the Arbuzov reactions of this invention are either simple or mixed phosphites of normal or branched chain configurations. The organic portions of these compounds may be substituted or unsubstituted. Examples of simple phosphites are trimethyl, triethyl, tri-n-butyl, tri-n-propyl, triisopropyl, tripentyl, trihexyl, tricyclopentyl, tricyclohexyl, triheptyl, tri-2-propene, tri-n-octyl, trinonyl and triundecyl phosphite. Useful mixed phosphites would include methyl diethyl, ethyl dimethyl, ethyl dipropyl, ethyl dihexyl, propyl dioctyl, methyl didodecyl, ethyl propyl, butyl, amyl diethyl, butyl di-n-propyl, n-dodecyl dimethyl, ethyl octyl propyl, and dimethyl hexyl. Examples of substituted triorganic phosphites would include dibromophenyl ethyl phosphite, trimethoxy ethyl phosphite and di(dichlorophenyl) methyl phosphite.

Suitable alkali metal diorgano phosphites would include the sodium, lithium and potassium salts of the trialkyl phosphites given above, as for example dimethyl sodium phosphite, diethyl potassium phosphite, diethyl lithium phosphite, dipropyl sodium phosphite, dibutyl potassium phosphite, diisopropyl sodium phosphite, diisoamyl potassium phosphite, diphenyl sodium phosphite, diphenyl potassium phosphite, di(cyclopropyl) sodium phosphite, di(hexyl) potassium phosphite and similar diorgano substituted phosphites. As in the case of the triorgano phosphites used in the Arbuzov method, the diorgano alkali metal phosphites can have a mixed structure and they may be substituted or unsubstituted. Examples of mixed diorgano alkali metal phosphites would include such compounds as methylethyl sodium phosphite, methylethyl potassium phosphite, methyl propyl sodium phosphite, butyl ethyl potassium phosphite, methyl hexyl sodium phosphite, ethyl butyl sodium phosphite and so forth. Examples of substituted compounds would include sodium di(2-chlorophenyl) phosphite, sodium di(p-dimethyl amino phenyl) phosphite, and sodium di(p-nitrophenyl) phosphite.

Typical halogenated butenes which can be utilized in the practice of both the Arbuzov and alkali diorgano phosphite methods of preparation would include 1,4-dichloro butene and 1,4-dibromobutene. The recent introduction of commercial quantities of 1,4-dichlorobutene by Petro-Tex Chemical Corporation makes this material particularly advantageous from an economical standpoint.

The applicant has also discovered that the unsymmetrical dihalobutene compounds, e.g. 3,4-dichloro-1 butene can be used to prepare the 1,4-diphosphonyl-2-butenes compounds taught in this invention according to the equation:

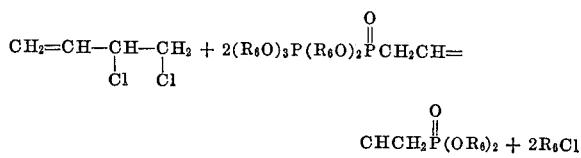

wherein $R_6$ is defined in the same manner as $R_1$, $R_2$, $R_3$ and $R_4$ in compounds I and II. This reaction gives added dimension to the teachings of this invention since one would normally expect that the use of a 3,4-dihalo-1-butene starting material would result in a 3,4-diphosphonyl-1-butene. The finding that 3,4-dihalo-1-butene compound undergoes the above rearrangement reaction means that a mixture of 1,4-dihalo-2-butene and 3,4-dihalo-1-butene can be used as a starting material in preparing the 1,4-diphosphonyl-2-butenes without first separating the components of the reaction mixture.

As can be appreciated from the foregoing discussion of starting materials, the use of either simple (symmetrical) or mixed (unsymmetrical) organophosphorus esters in the Arbuzov and alkali diorgano phosphite reactions allows for the production of esters of 1,4-diphosphonyl butene which can contain ester groups which are the same or different that is, where $R_1$, $R_2$, $R_3$ and $R_4$ as previously defined are the same or different. This is advantageous since different types of ester end groups often impart differing beneficial polymerization and flame-retardant properties to host polymeric systems. To illustrate the production of either simple or mixed esters of 1,4-diphosphonyl butene the following equations should be considered. If dimethyl sodium phosphite is used as a starting material, the alkali diorgano phosphite reaction produces the simple ester according to the equation:

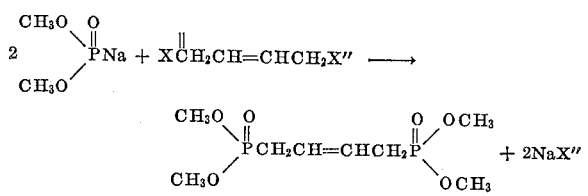

whereas, if a mixed ester such as methyl hexyl sodium phosphite were used, a mixed ester would result according to the equation:

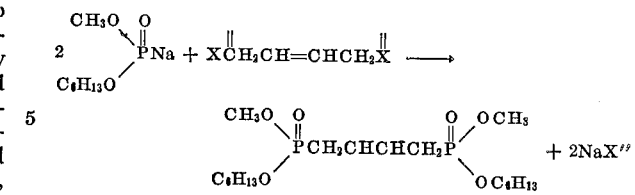

Similar variations can be made in the Arbuzov methods of preparation.

It is also within the scope of this invention to prepare mixed (unsymmetrical) esters of 1,4-diphosphonyl-2-butene by carrying out the overall reactions in stages with different organophosphorous compounds. For example, a mixed ester such as 1,1 - dimethyl 4,4 - diethyl - 1,4-diphosphonyl-2-butene can be prepared by the Arbuzov method in the following manner:

Step 1: 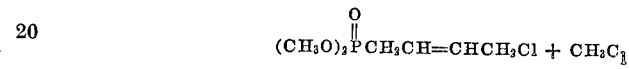

Step 2: 

Similar step reactions can be utilized to produce mixed esters according to the alkali diorgano phosphite method. Those skilled in the art will also appreciate that a combination of the Arbuzov and alkali diorgano phosphite methods can be used to produce the tetra esters of this invention. Either method can be employed in Step 1. For example, the

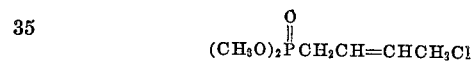

produced in Step 1 of the above Arbuzov reaction might just as well have been prepared by the alkali diorgano phosphite reaction:

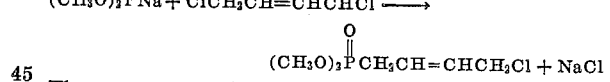

These step procedures are particularly well adapted to producing a novel class of mixed tetra esters of 1,4-diphosphonyl - 2 - butenes in which all four ester groups are different. Thus, 1' - (n - hexyl-n-octyl)-4'(n-butyl-ethyl) diphosphonyl-2-butene, where 1' and 4' indicate the position of the phosphonyl groups, can be produced by the following combination of the two procedures:

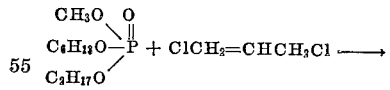

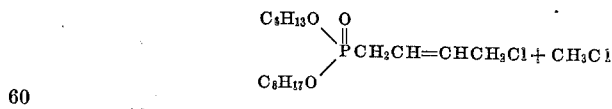

Step 2.—Alkali diorgano phosphite reaction:

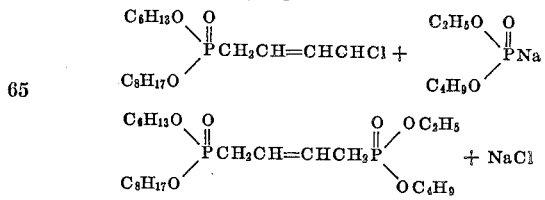

In order to help in deciding which reactions should be used to produce particular esters of butene diphosphonates, the applicant suggests the following general guidelines. The alkali diorgano phosphite reaction is the preferable method of preparing the hindered alkyl esters such as the isooctyl and isopropyl esters and the substituted and unsubstituted aryl esters. On the other hand, the Arbuzov reaction seems to give better results for reactions which involve the straight chain alkyl esters. The overall preferred embodiments for the preparation of the mixed esters, particularly the mixed esters in which $R_1$, $R_2$, $R_3$ and $R_4$ are all different is to use organo phosphorous starting materials in which the ester groups have substantially different molecular weights.

In accordance with another aspect of this invention, it has been found that another novel class of compounds herein termed polymers of esters of 1,4-diphosphonyl butene and their halogenated derivatives can also be used to impart flame-retardant characteristics to polymeric systems. Representative polymers of esters of 1,4-diphosphonyl butene may be represented by the general formulas:

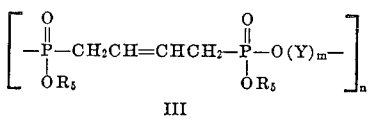

III

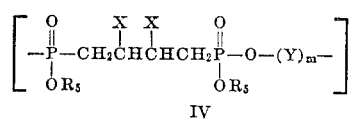

IV

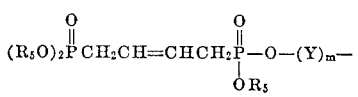

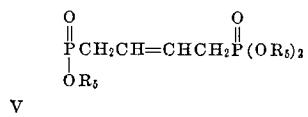

V

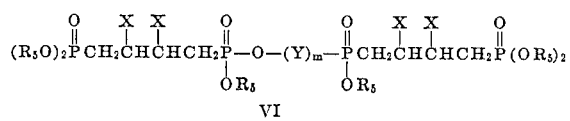

VI wherein $R_5$ is defined in the same manner as $R_1$, $R_2$, $R_3$, and $R_4$ and wherein Y is

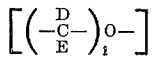

where C is carbon and D and E are independently selected from the group consisting of hydrogen, bromine, chlorine, alkyl and substituted alkyl having 1 to 20 carbon atoms, aryl and substituted aryl having 6 to 15 carbon atoms, and wherein $n$ is an integer less than 5,000, $l$ is an integer from 2 to 15 inclusive, and $m$ is an integer from 1 to 50 inclusive.

The above polymers of esters of 1,4-diphosphonyl butene and their halogenated derivatives are prepared by condensing the monomeric butene compounds of Figures I and II with varying molecular ratios of compounds which contain active hydrogen groups. The most preferred compounds containing such active hydrogen groups are the polyols, that is where Y is the residue of a polyhydroxy alcohol. Other compounds possessing active hydrogen atoms would include the amines, polyamines, aminoalcohols, polyesters, polyethers, ureas, amides and oximes. For example, a reaction of 1 mole of a diol with mole of a halogenated derivative of an ester of 1,4-diphosphonyl butene would proceed according to the equation:

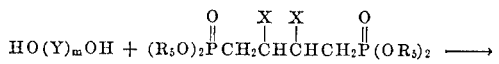

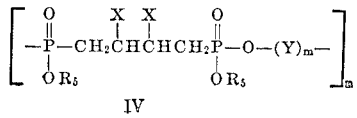

IV while a reaction of 1 mole of diol with 2 moles of the halogenated derivative of an ester of 1,4-diphosphonyl butene would give a bridged phosphonate product according to the equation:

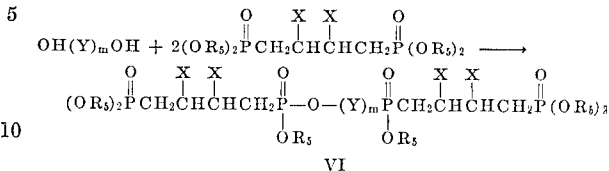

VI and finally a reaction of 4 moles of the diol would produce:

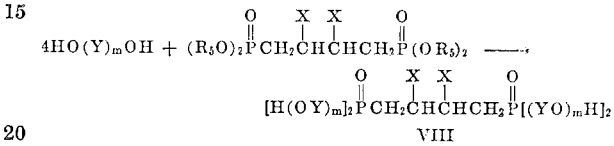

VIII wherein $R_5$ is defined in the same manner as $R_1$, $R_2$, $R_3$ and $R_4$ and Y, $m$ and $n$ are as defined in the above paragraphs. The non-halogenated form of compounds VIII can be produced by analogus reactions involving 4 moles of diol and 1 mole of the non-halogenated ester of 1,4-diphosphonyl butene. Those skilled in the art will recognize that compound VIII with its terminal free hydrogen groups represents a condensation product which would react or chemically bond with many polymeric materials, for example, with the isocyanate starting materials of polyurethane. Thus, a variation of the molar ratios of the ester of 1,4-diphosphonyl butene and the diol can be used to produce either the unreactive forms such as IV and VI which are preferred, or the less preferred reactive forms such as VIII.

Examples of useful polyol compounds which can be used in these reactions would include such compounds as ethylene glycol, butane diol, 2,3-dibromobutane diol, polyethylene diols having molecular weights of 200 to 2,000, polypropylene diols having molecular weights of 200 to 1,000, polyethylene glycols having molecular weights of 200 to 3,000, polypropylene glycols having molecular weights of 200 to 3,000, ethylene glycol, diethylene glycol, but-2-ene-1,4-diol, 2,3-dibromo-1,4-butane diol, but-2-yne-1, 4 diol, triethylene glycol, propylene glycol, dipropylene glycol, tripropylene glycol, 1,4-butanediol, thiodiglycol, glycerol, trimethylolethane, trimethylolpropane, ether triols made from glycerine and propylene oxide having molecular weights of 1,000 and 3,000 (available commercially as LG–168 and LG–56, respectively), ether containing triols from 1,2,6-hexanetriol and propylene oxides having molecular weights of 750, 1,500, 2,400 and 4,000 (available commercially as LHT 240, LHT 112, LHT 67 and LHT 42, respectively), sorbitol-propylene oxide adduct having a molecular weight of 1,000, pentaerythritol-propylene oxide adduct having a molecular weight of 1,000 trimethylol phenol, oxypropylated sucrose, triethanolamine, pentaerythritol, diethanolamine, castor oil, blown linseed oil, blown soya oil, N,N,N', N'-tetrakis (2-hydroxyethyl) ethylenediamine, N,N,N',N'-tetrakis (2-hydroxypropyl) ethylenediamine, mixed ethylene glycolpropylene glycol adipate resin (molecular weight 1,900), polyethylene adipate phthalate, and polyneopentylene sebacate.

In the practice of this invention, the dihalobutene and the organophosphorus compounds may be reacted in any suitable reaction vessel, so that the reaction may be continuous, intermittent, or batch-type and still remain in the scope of this invention. The reactants may be reacted or added to the reaction zone simultaneously, as for example, when the reaction is carried out continuously in a column, or in any sequence, as for example when the reaction is carried out in the batchwise examples disclosed later in this application. Conveniently, the organophosphorus compound used in the Arbuzov reaction may be added to the dihalo butene which is previously preheated to reflux at a rate sufficient to maintain a steady evolution of the organo halide by-product. This feature of the Arbuzov reaction merits some elaboration. This process is dependent on the efficient removal of the organo halide by-product as it is formed, preferably by maintaining the temperature in excess of its boiling point in order to permit evolution of the by-product as a gas. If this were not accomplished, the presence of the organo halide within the process system would catalyze the rearrangement of the triorgano phosphite to an organo phosphonate, as in the regular Arbuzov reaction, depicted by the following equation:

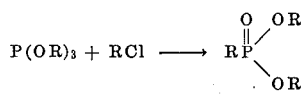

Therefore, the preferred embodiment of this invention is to remove the organo halide by-product from the site of the Arbuzov reaction.

Upon completion of the Arbuzov or alkali diorgano phosphite reactions, the esters of 1,4-diphosphonyl butenes can be halogenated by standard halogenation procedures such as those taught in examples 3 and 4 of this disclosure. The halogenation procedures are preferably conducted at temperatures below 100° C.

In general, the Arbuzov reaction takes place at temperatures ranging from 30° C. to 300° C., preferably from 60° C. to 200° C., and most preferably from 80° C. to 180° C. The alkali diorgano phosphite reactions are carried out at subambient, ambient and super ambient temperatures between −10° C. and 250° C., preferably between 15° C. and 150° C., and most preferably from 25° C. to 100° C.

Atmospheric pressure is usually employed, but pressure in excess or less than atmosphere may also be employed. For example, when the Arbuzov reaction is being employed and $R_1$, $R_2$, $R_3$ etc. are lower molecular weight groups such as methyl or ethyl, a gaseous by-product is formed and hence these reactions are conveniently carried out at atmospheric pressure, in a temperature range of 80° to 150° C. In the case of the alkali diorgano phosphite reactions, the reactions are carried out under the same general conditions as the Arbuzov reactions and the alkali metal halide by-products are separated by any suitable means including filtration, extraction and distillation and the like. Generally, the alkali metal halide will be filtered off and the remaining reaction mixture fractionally distilled. Although the use of diluents is not ordinarily essential to these reactions, this does not preclude the possibility of using such diluents, particularly when organo phosphorus esters containing ester groups larger than 8 carbon atoms are used as starting materials. Inert organic solvents particularly alcohols, aliphatic and aromatic hydrocarbons, for example tetrahydrofuran, xylene, toluene, chlorobenzene, benzene, dioxane, ether, or hexane, are particularly well suited as diluents in Arbuzov reactions. The organo phosphorus product is readily recovered from the reaction mixture by isolating procedures known to those skilled in the art, e.g., by decanting the product phase from the by-product and then removing any diluent by distillation. In most instances however, the final product is purified by vacuum distillation.

When an organic diluent is used, the rapidity of the reaction is evidenced by the rate at which the insoluble alkali metal halide is formed. Owing to the ease of reaction, application of heat is not required; on the contrary, when working with large quantities of reactants, it is frequently advisable to operate at decreased temperature, e.g., with ice-cooling, in order to mitigate the speed of reaction. The use of inert organic liquid diluents or solvents may serve not only to effectuate a smooth reaction, but it may also facilitate separation of the by-product alkali metal halide.

In the alkali metal diorgano phosphite reactions, the diluents may be removed by topping processes typically carried out at about 50° C. to 150° C. and 1–10 mm. pressure for most diluents. If a more highly purified product is desired, the bottoms from such topping processes may be distilled in a molecular still to obtain a more purified product as the distillate.

These reactions are conducted for periods of time sufficient to obtain the maximum yields, generally from one to twenty-four hours. Known means of determining the completion of the reactions are utilized. For example, an iodine titer of the phosphite present during a rearrangement reaction may be utilized. When a negligible titer is obtained, that is, less than about 5% of the original titer, the reaction is deemed complete.

The condensation reactions are most conveniently carried out at elevated temperatures in the range of 40° C. to 250° C. with the preferred range being 80° C. to 180° C. in the presence of a mineral acid catalyst. Suitable mineral acids would include $H_2SO$, $HNO_3$, $HI$ and $H_3PO_4$, as well as sulfonic acids such as benzene sulfonic acid and toluene sulfonic acid.

To further illustrate the teachings of this invention, the following example are offered. The examples are not intended to limit the teachings of this invention to the specific materials or conditions specified therein. The examples also contain typical examples of formulations which produce flame-retardant polymeric systems.

EXAMPLE 1

Preparation of tetraethyl-1,4-diphosphonyl butene by Arbuzov method

Triethyl phosphite (332 g., 2.0 moles) is charged into a two neck flask equipped with a magnetic stirrer, thermometer and air cooled condenser fitted with a Stark and Dean receiver mounted with a Dry Ice condenser. About 126 g. (1 mole) of 1,4-dichloro-2-butene is added and the mixture and heated to about 125–130° C. whereupon ethyl chloride begins to collect in the receiver. The reaction mixture is maintained at this temperature for about 6 hours. The reaction is assumed to be complete when a negligible iodine titer is obtained, i.e. after about 127 ml. (90% of theoretical yield) of the ethyl chloride by-product is collected. The final reaction mixture is then vacuum distilled in the temperature range of 188–194° C. at a 5 mm. vacuum until approximately 285 g. (87% of the theoretical yield) of the tetraethyl-1,4-diphosphonyl butene are collected. The product is characterized by infrared and $H'$-NMR spectroscopy.

EXAMPLE 2

Preparation of tetraethyl-1,4-diphosphonyl butene by a variation of Arbuzov method The same compounds used in the Arbuzov reaction of Example 1 are again used, however, the triethyl phosphite (332 g., 2.0 moles) is added to the 1,4-dichloro-2-butene which was previously preheated to reflux at about 157° C. at a rate sufficient to maintain a steady evolution of the ethyl chloride by-product. After about 4 hours, 132 ml. of the by-product is collected, and a negligible iodine titer is obtained. The final reaction mixture is again vacuum distilled under the same conditions of Example 1 and about 280 g. (85% of theoretical yield) of the tetraethyl-1,4-diphosphonyl butene are collected.

EXAMPLE 3

Bromination of tetraethyl-1,4-diphosphonyl-2-butene

Approximately 0.5 moles (164 g.) of tetraethyl-1,4-diphosphonyl-2-butene of Example 1 are dissolved in 200 ml. of carbon tetrachloride. Bromide, 0.5 mole (80 g.) is also dissolved in carbon tetrachloride to produce about 100 ml. of solution. The bromine solution is added to the tetraethyl-1,4-diphosphonyl-2-butene solution at a rate of 8–10 ml. per minute. The temperature of the reaction mixture increases to 30° C. during this addition. The final mixture is rotatory evaporated to a yellow syrup. The product of about 0.45 moles of tetraethyl-2,3-dibromo-1,4-diphosphonyl butane, is characterized by infrared, H'-NMR spectroscopy and bromine analysis.

EXAMPLE 4

Chlorination of tetraethyl-1,4-diphosphonyl butene

The techniques of Example 3 are followed, using 0.5 moles (35.5 g.) of chlorine in place of bromine to yield the product tetraethyl-2,3-dichloro - 1,4 - diphosphonyl butane which is identified by infrared, H'-NMR spectroscopy and chlorine analysis.

EXAMPLE 5

Preparation of tetraethyl-1,4-diphosphonyl butene by alkali diorgano phosphite method To a solution of sodium diethyl phosphonate (260 g., 2 moles) in 500 ml. THF (tetrahydrofuran) are slowly added 125 g. (1 mole) of 1,4-dichloro-2-butene. This solution is brought to about 75–80° C. for about 3 hours. The resulting solution is then filtered to remove the sodium chloride and the filtrate is evaporated to a yellow syrup. The resulting syrup is then purified by distillation at 190–200° C. and 5 mm. vacuum to yield 220 grams (85% of theoretical) of tetraethyl-1,4-diphosphonyl butene. The product is characterized by infrared and H'-NMR spectroscopy.

EXAMPLE 6

Preparation of tetraethyl-1,4-diphosphonyl butene

The techniques of Example 5 are repeated using diethyl potassium phosphonate in place of diethyl sodium phosphite. About 210 g. of tetraethyl-1,4-diphosphonyl butene are produced.

EXAMPLE 7

Preparation of tetramethyl-1,4-diphosphonyl butene

The procedures and equipment of Example 1 are used in reacting 242 g. (2 moles) of trimethyl phosphite with 126 g. (1 mole) of 1,4-dichloro-2-butene. The reaction mixture is maintained at about 120° C. for 5 hours. This reaction is assumed to be complete after about 125 ml. (87% theoretical yield) of the methyl chloride by-product was collected. The final mixture is distilled in the temperature range of 180–190° C. at 5 mm. vacuum. Approximately 324 g. (86% theoretical) of tetramethyl-1, 4-diphosphonyl butene is obtained. Again, this product is characterized by infrared and H'-NMR spectroscopy.

EXAMPLE 8

Bromination of tetramethyl-1,4-diphosphonyl-2-butene

Approximately 0.5 moles (133 g.) of the tetramethyl 1,4-diphosphonyl-2-butene of Example 7 are dissolved in 200 ml. of carbon tetrachloride. Bromine, 0.5 mole (80 g.) is also dissolved in carbon tetrachloride to produce about 100 ml. of solution. The bromine solution is added to the tetramethyl-1,4-diphosphonyl-2-butene solution at a rate of 8–10 ml. per minute. The final mixture is rotatory evaporated to a yellow syrup. About 0.45 mole of the product, tetramethyl-2,3-dibromo-1,4 -diphosphonyl butane is obtained and characterized by infrared. H'-NMR spectroscopy and bromine analysis.

EXAMPLE 9

Chlorination of tetramethyl-1,4-diphosphonyl butene

Tetramethyl-2,3 - dichloro-1,4 - diphosphonyl butane is prepared by cooling a solution of tetramethyl-1,4-diphosphonyl-2-butene (27.2 g.) in chloroform to a temperature of −10° C. obtained by means of a salt ice bath. Chlorine gas is dubbled into solution until the unsaturated butene is completely reacted. The reacted mixture is allowed to reach room temperature and the chloroform is removed by evaporating in vacuo. The yellow syrup which remains is identified as tetramethyl-2,3-dichloro-1,4-diphosphonyl butane by infrared, H'-NMR spectroscopy and chlorine analysis which shows a chlorine content of 20.1%.

EXAMPLE 10

Preparation of tetrahexyl-2-3-dibromo-1,4 diphosphonyl butane

The procedures and equipment of Example 1 are used in reacting 250 g. (1 mole) of tributyl phosphite with about 63 g. (0.5 mole) of 1,4-dichloro-2-butene. The reaction mixture is maintained at about 145° C. for 8 hours. This reaction is assumed to be complete after about 81 ml. (89% theoretical yield) of the butyl chloride by-product is collected. The final mixture is distilled in the temperature range of 210–230° C. at 5 mm. vacuum. Approximately 125 g. (57% theoretical yield) of the tetrabutyl-1,4-diphosphonyl butene is obtained. The product is then brominated in accordance with the procedures described in Example 3. The final product, tetrabutyl-2-dibromo-1,4-diphosphonyl butane is characterized by infrared and H'-NMR spectroscopy and bromine analysis.

EXAMPLE 11

Preparation of tetra-n-octyl-1,4-diphosphonyl-2-butene

Again the procedures and equipment of Example 1 are used in reacting 209 g. (1 mole) of tri-n-octyl phosphite with about 63 g. (0.5 mole) of 1,4-dichloro-2-butene. The reaction mixture is maintained at about 140–150° C. for 2 hours. The temperature is then increased to 160° C. for 6 hours. The reaction is assumed to be complete after 110 ml. (74% theoretical yield) of the n-octyl chloride by-product is collected. The final product is heated to 160° C. in vacuo to remove volatiles. The yellow syrup which remains is predominantly tetra-n-octyl-1,4-diphosphonyl-2-butene as determined by H'-NMR spectroscopy.

EXAMPLE 12

Preparation of substituted tetra alkyl-1,4-diphosphonyl-2-butenes

The techniques and molar proportions of the reaction of Example 2 are repeated using substituted alkyl phosphites in place of the triethyl phosphite of that example. The results of these reactions are summarized as follows:

| Starting material | Product comprises |
| --- | --- |
| Tri(cyanomethyl) phosphite | Tetra(cyanomethyl)-1,4-diphosphonyl-2-butene. |
| Tri(2-nitrobutyl) phosphite | Tetra(2-nitrobutyl)-1,4-diphosphonyl-2-butene. |
| Tri(2-methoxyoctyl) phosphite | Tetra(2-methoxyoctyl)-1,4-diphosphonyl-2-butene. |

EXAMPLE 13

Preparation of tetraphenyl-1,4-diphosphonyl-2-butene

To a 100 ml. of 0.1 molar sodium diphenyl phosphite in tetrahydrofuran are added dropwise a solution of 1,4-dibromo-2-butene at 50° C. for 6 hours. The resulting slurry is then cooled to room temperature and filtered to remove the sodium bromide and the filtrate is evaporated to a yellow syrup. The resulting syrup is then purified by dissolving it in chloroform and extracting three times with water. The chloroform layer was dried over sodium sulfate and evaporated to a yellow syrup (21 g.). This syrup was characterized as tetraphenyl-diphosphonyl-2-butene by H'-NMR and infrared spectroscopy.

EXAMPLE 14

Preparation of tetraphenyl 2,3-dibromo-1,4-diphosphonyl butane

The bromination and compound identification procedures of Example 3 are followed to yield and identify the product tetraphenyl-2,3 - dibromo-1,4 - diphosphonyl butane.

EXAMPLE 15

Preparation of tetra (2-nitrophenyl)-1,4-diphosphonyl-2-butene

The techniques and molar proportions of Example 13 are repeated using sodium di(2-nitrophenyl) phosphite in place of the sodium diphenyl phosphite of that example. An 80% yield of the final product is obtained and is identified by infrared and H'-NMR spectroscopy.

EXAMPLE 16

Preparation of other tetra (substituted phenyl)-1,4-diphosphonyl-2-butenes

The techniques and molar proportions of the reaction of Example 13 are repeated using other alkali substituted diorgano phosphites in place of the sodium diphenyl phosphite of that example. The results of these reactions are summarized as follows:

| Starting materials | Product comprises |
| --- | --- |
| Sodium di(2-chlorophenyl) phosphite. | Tetra(2-chlorophenyl)-1,4-diphosphonyl-2-butene. |
| Potassium di(2-ethylphenyl) phosphite. | Tetra(2-ethlphenyl)-1,4-diphosphonyl-2-butene. |
| Sodium di(2,4-dibromophenyl) phosphite. | Tetra(2-4,dibromophenyl)-1,4-diphosphonyl butene. |
| Sodium di(p-methoxyphenyl) phosphite. | Tetra(p-methoxyphenyl)-1,4-diphosphonyl butene. |
| Sodium di(p-dimethylaminophenyl) phosphite. | Tetra(p-dimethylaminophenyl)-1,4-diphosphonyl butene. |
| Sodium di(2,4-dimethylphenyl) phosphite. | Tetra(2,4-dimethylphenyl)-1,4-diphosphonyl butene. |
| Sodium di(p-phenoxyphenyl) phosphite. | Tetra(p-phenoxyphenyl)-1,4-diphosphonyl butene. |

EXAMPLE 17

Preparation of tetrapropenyl-1,4-diphosphonyl butene

To a solution of sodium dipropenyl phosphonate (18.6 g., 0.1 mole) in THF are slowly added about (10.7 g., 0.05 mole) of 1,4-dibromo-2-butene. This solution is kept at 25° C. for about 12 hours. The resulting solution is then filtered to remove the sodium chloride and the filtrate is evaporated. The product is purified by dissolving in chloroform, washing three times with water, drying the chloroform layer over sodium sulfate and removing the chloroform by evaporation in vacuo. The yellow syrup (9.5 g.) is characterized by H'-NMR and infrared spectroscopy.

EXAMPLE 18

Preparation of tetra (2,3-dichlorobutyl)-2,3-dichloro-1,4-diphosphonyl butane

Sodium dibutenyl phosphonate is substituted for the sodium dipropenyl phosphonate of Example 17. Under substantially the same reaction conditions of Example 16, this reaction yields the product tetra (2-butenyl)-1,4-diphosphonyl butene which is then chlorinated by the procedures of Example 9 to yield the final product characterized by infrared, H'-NMR and chlorine analysis as tetra (2,3-dichlorobutyl)-2,3-dichloro-1,4-diphosphonyl butane.

EXAMPLE 19

Preparation of tetracyclohexyl-2,3-dichloro-1,4-diphosphonyl butane

The procedures and equipment of Example 1 are used in reacting 16.2 g. (0.1 mole) of tricyclohexyl phosphite with 6.6 g. (0.053 mole) of 1,4-dichloro-2-butene. The reaction mixture is maintained at about 140° C. for 4 hours and then increased to 160° C. for 12 hours. This reaction is assumed to be complete after about 9.2 ml. (78% theoretical yield) of the cyclohexyl chloride by-product was collected. The final mixture is heated in vacuo at 200° C. at 5 mm. vacuum for 8 hours. The remaining yellow syrup, 17 g. (63% theoretical) is characterized as the desired product by infrared and H'-NMR spectroscopy. The product is then chlorinated by the procedures described in Example 9. Infrared and H'-NMR spectroscopy are used in conjunction with chlorine analysis to identify the final product.

EXAMPLE 20

Preparation of tetra (2-cyclohexyl phenyl)-2,3-dichloro-1,4-diphosphonyl butane

Sodium di-(2-cyclophenyl phenyl) phosphite is substituted for the sodium diphenyl phosphite of Example 13. Under substantially the same reaction conditions of Example 13, this reaction yields the product tetra(2-cyclohexyl phenyl)-1,4-diphosphonyl butene which is then chlorinated by the procedures of Example 9 to yield the final product.

EXAMPLE 21

Preparation of 1',1'-dimethyl-4',4'-diethyl-1,4-diphosphonyl-2-butene by 2 step procedure One mole of trimethyl phosphite is reacted with 1 mole of 1,4-dichloro-2-butene at about 120–130° C. for 8 hours. The reaction is assumed to be complete after about 36 ml. (87% of theoretical yield) of the methyl chloride by-product is collected. This reaction mixture is distilled in the range of 140–160° C. at 5 mm. vacuum. Approximately 158 g. (80% theoretical) of dimethyl-1-phosphonyl-4-chloro-2-butene is obtained and identified by infrared and H'-NMR. This product is then reacted with 0.8 mole (133 g.) of triethyl phosphite at 115–125° C. for 8 hours. This second step is assumed to be complete when about 53 ml. (82% of theoretical yield) of ethyl chloride by-product is collected. This final reaction mixture is distilled in the range of 170–190° C. at 5 mm. vacuum. Approximately 222 g. (80% theoretical) of 1',1'-dimethyl-4',4' diethyl-1,4-diphosphonyl-2-butene is obtained and identified by infrared and H'-NMR.

EXAMPLE 22

Preparation of 1',1'-dimethyl-4',4'-diphenyl-1,4-diphosphonyl-2-butene

The same procedures, equipment and reaction conditions of Example 18 are used except that the second step reaction involves reacting molar equivalents of sodium diphenyl phosphite with dimethyl-1-phosphonyl-4-chloro-2-butene according to example 13. The 1',1'-dimethyl-4',4'-diphenyl-1,4-diphosphonyl-2-butene obtained is characterized using H'-NMR and infrared spectroscopy.

EXAMPLE 23

Preparation of a mixed ester, 1'-(methyl-hexyl)-4' (methyl-hexyl) diphosphonyl-2-butene Dimethyl hexyl phosphite (382 g., 2.0 moles) is charged into the equipment described in Example 1. About 125 g. (1 mole) of 1,4-dichloro-2-butene is added and the mixture heated to about 130–135° C. whereupon methyl chloride begins to collect in the receiver. The reaction mixture is maintained at this temperature for about 14 hours. The reaction is assumed to be complete when a negligible iodine titer is obtained, i.e. after about 66 ml. (70% theoretical yield) of the methyl chloride by-product is collected. This reaction mixture is then vacuum distilled in the temperature range of 205–220° C. at 1 mm. vacuum until approximately 149 g. (45% theoretical yield) of the 1' - (methyl-hexyl) - 4'(methyl-hexyl) diphosphonyl-2-butene are collected. The product is characterized by infrared and H'-NMR spectroscopy.

EXAMPLE 24

Preparation of a mixed ester, 1'-(n-hexyl-n-octyl)-4'(n-butyl-ethyl) diphosphonyl-2-butene by combination of Arbuzov and alkali diorganophosphite reactions One mole (300 g.) of sodium n-hexyl-n-octylphosphite in 1 liter of tetrahydrofuran is reacted with 1 mole of 1,4-dibromo-2-butene in 500 ml. of tetrahydrofuran at about 50° C. for 24 hours. Following this reaction one mole of sodium n-butyl-n-ethylphosphite in 1 liter of tetrahydrofuran is added and the mixture stirred 24 hours at 50° C. The resulting solution is then filtered to remove the sodium chloride by-product and the filtrate is evaporated to a yellow syrup. This syrup is generally used as is for further work, however, it can be purified by distillation at 220–240° C. and 0.01 mm. vacuum to yield 1'-(n-hexyl-n-octyl)-4'-(n-butyl ethyl) diphosphonyl-2-butene which is characterized by infrared and H'-NMR spectroscopy.

EXAMPLE 25

Preparation of tetraethyl-1,4-diphosphonyl butene from a mixture of 3,4-dichloro-1-butene and 1,4-dichloro-2-butene Triethyl phosphite (330 g., 2 moles) is charged into a two neck flask equipped with a magnetic stirrer, thermometer and air cooled condenser. The condenser is fitted with a Stark and Dean receiver mounted with a Dry Ice condenser. A mixture of one-half mole (62 g.) of 3,4-dichloro-1-butene and one-half mole (62 g.) of 1,4-dichloro-2-butene is added to the triethyl phosphite and the resulting mixture heated to about 130–135° C. whereupon ethyl chloride begins to collect in the receiver. After about 99 ml. (85% of theoretical yield) of the ethyl chloride by-product is collected, the reaction is assumed to be complete. No substantial side reactions are evident. The reaction product is then vacuum distilled in the temperature range of 188–194° C. at 5 mm. vacuum. Approximately 292 g. (89% of theoretical yield) of tetraethyl-1,4-diphosphonyl butene are collected. The product is characterized by infrared and H'-NMR spectroscopy.

EXAMPLE 26

Preparation of tetraphenyl-1,4-diphosphonyl butene from a mixture of 3,4-dichlor-1-butene and 1,4-dichloro-2-butene The equipment procedures and reaction conditions of Example 13 are used in the reaction of sodium diphenyl phosphite (25.6 g., 0.1 moles) in 100 ml. tetrahydrofuran with a mixture of 3,4-dichloro-1-butene (3.1 g., 0.025 mole) and 1,4-dichloro-2-butene (3.1 g., 0.025 mole) in 50 ml. of tetrahydrofuran. Approximately 17 g. (65% theoretical) of tetraphenyl-1,4-diphosphonyl butene are collected.

EXAMPLE 27

Condensation of tetraethyl-1,4-diphosphonyl-2-butene with ethylene glycol

In accordance with the teachings of this example, a condensation product of tetraethyl - 1,4 - diphosphonyl-2-butene and ethylene glycol is prepared by reacting the above compound in a 1:1 molar ratio (328 g. of the butene and 62 g. of the ethylene glycol). The mixture is charged into a two neck flask equipped with a magnetic stirrer, thermometer and air cooled condenser fitted with a Stark and Dean receiver mounted with a Dry Ice condenser. The mixture is heated to 125–130° C. in the presence of a sulfuric acid (0.5 g.) catalyst. A total time of 24 hours is required to complete the transesterification and 90 ml. of ethanol by-product is collected. The end product is a viscous yellow oil. Infrared and H'-NMR are used to identify the product.

The reaction is repated using 2 moles of ethylene glycol to 1 mole of tetraethyl-1,4-diphosphonyl-2-butene. The product is a very viscous yellow liquid.

The reaction is again repeated using 4 moles of ethylene glycol. The product is a solid mass at room temperature.

EXAMPLE 28

Condensation of tetraethyl-2,3-dibromo-diphosphonyl butene with 1,4-butane diol

A condensation product of tetraethyl-2,3-dibromo-1,4-diphosphonyl butane and 1,4-butane diol is prepared by reacting the above compounds in a 1:1 molar ratio. The mixture is heated to 120–130° C. for 18 hours in the presence of the sulfuric acid catalyst. Infrared and H'-NMR spectroscopy are used to identify the compound. The reaction is repeated using 2 moles of 1,4-butane diol to yield a very viscous product. The reaction is again repeated using 4 moles of 1,4-butane diol. This product forms a glass at room temperature.

EXAMPLE 29

Condensation of tetraphenyl-2,3-dibromo-1,4-diphosphonyl butane with 2,3-dibromobutane diol A condensation product of tetraphenyl-2,3-dibromo-1,4-diphosphonyl butane and 2,3-dibromobutane diol is prepared by reacting one mole of each of the above compounds. The mixture is heated to 150–160° C. for about 36 hours in the presence of 0.5 grams of a sulfuric acid. The final reaction mass was dissolved in chloroform washed with 1% sodium carbonate, washed with water and the chloroform layer dried over sodium sulfate. After removing the chloroform in vacuum the brown viscous liquid which remained gave infrared and H'-NMR spectra characteristic of a condensed brominated phenyl phosphonate.

EXAMPLE 30

Tetra sodium 2-butene-1,4-diphosphonic acid

Tetraisopropyl-1,4-diphosphonyl-2-butene (38.4 g.) is refluxed 48 hours 1N HCl. The PH of the resulting mixture is adjusted to 10.2 with 4N sodium hydroxide. The addition of acetone to first point of cloudiness produced crystals of tetrasodium 2-butene-1,4-diphosphonic acid. H'-NMR analysis is employed in characterizing this product. After drying 8 hours at 105° C. in vacuo, the product gives a phosphorus analysis of 17.8% indicating a dihydrate.

EXAMPLE 31

2,3-dibromo-butane-1,4-diphosphonic acid

Tetrasodium 2-butene-1,4-diphosphonic acid (3.40 g.) is dissolved in 100 ml. of water. To this solution were added 210 ml. of 0.10M $Ba(OH)_2$ solution. The barium-2-butene-1,4-diphosphorate precipitate is isolated by filtration and washed twice with 50 ml. of water. This barium salt is then treated with 220 ml. of 0.1M sulfuric acid. The barium sulfate is removed by filtration. The filtrate is evaporated to a yellow syrup. This syrup is dissolved in 100 ml. chloroform and 1.60 g. of bromine are added and the mixture is left overnight. The chloroform was removed by evaporation, leaving a heavy syrup which was characterized as 3,3 - dibromo - butane-1,4-diphosphonic acid.

EXAMPLE 32

Tetrahydroxyethyl-1,4-diphosphonyl-2-butene

A mixture of tetraethyl - 1,4 - diphosphonyl-2-butene (32.8 g.) and ethylene glycol (25 g.) with 0.1 ml. of $H_2SO$ are heated to 120° C. for 12 hours. When evolution of ethanol ceased, the viscous reaction mixture is dissolved in 100 ml. of water. The pH of this solution is adjusted to 7.0 using Dowex-50 (Na). This solution is filtered to remove the exchange resin and the filtrate is evaporated to a yellow syrup. The H'-NMR and infrared spectra indicated this material was tetrahydroxyethyl-1,4-diphosphonyl-2-butene.

EXAMPLE 33

Other condensation products

The transesterification reactions according to Example 26 are carried out under the same conditions and in the same molar ratios using other products containing active hydrogens, such as ethylene glycol, polyethylene diol (molecular weight from 200 to 2,000) polypropylene diol (molecular weight from 200 to 1,000) as well as glycerol, pentaerythritol, and polypropylene glycol. The appropriate condensation products are obtained.

EXAMPLE 34

Fine celled urethane foams are prepared in accordance with formulations I or II described below. Varying amounts (proportions are expressed in parts by weight) of the compounds of Examples 1 through 33 are incorporated therein and tested for flame-retardant properties.

Foam formulation I

Polyester portion.—A polyester is prepared by the esterification of 5 moles (670 parts) of trimethylolpropane with 3 moles (438 parts) of adipic acid by known techniques. The resin thus formed has a hydroxyl number of about 100.

Diol portion.—To about 100 parts of the polyester adipate system described above is added 0.5 parts of silicone surfactant (silicone X–520), 0.4 parts of trimethyl butanediamine and a blowing agent.

Prepolymer portion.—A prepolymer is prepared by the addition of 20 parts of the above-described polyester to 80 parts of toluene diisocyanate (commercial mixture of 80% 2,4-tolunediisocyanate, and 20% 2,6-toluenediisocyanate). This mixture is then heated for two hours at a temperature of 100° C.

Preparation of foam.—The foam systems are prepared by adding about 100 parts of the diol portion to 50, 20, or 0 (control) parts of selected compounds of Examples 1 through 33. A composition of Foam I having 50 parts of the flame-retardant ingredient would be designated in the data table as I-50. The specific ester of 1,4-diphosphonyl butene is designated by the number of the example in which it is prepared. One hundred parts of the prepolymer portion are then added and mixed at a temperature of about 25° C. for about 30 seconds and poured to yield a fine celled rigid urethane Foam I. An analysis of the Foam I compositions appears as part of the table.

Foam formulation II

A polyurethane foam is prepared by reacting:

53.2 g. of methylenediphenyl diisocyanate
40.0 g. of polyethylene glycol (molecular weight 200)
0.2 g. of silicone surfactant (silicone X–520)
X g. of selected compounds of Examples 1 through 33 wherein X is 20 g., 10 g., or 0 g. (control).

A foam of the above type having 20 g. of the flame-retardant would be designated as Foam II-20. An analysis of these Foam II compositions is incorporated in the flammability data table.

EXAMPLE 35

Flammability tests

The flame-retardant characteristics of esters of 1,4-diphosphonyl butenes and their halogenated derivatives are established in accordance with the standards of ASTM D-635-63. In these tests the flame of a Bunsen burner is applied to the front edge of the polymer specimens cut in 5″ x ½″ x ½″ sections and marked at 1″ and 4″. The specimen is clamped horizontally along its horizontal axis, and at 45 degrees on its traverse axis. Beneath the test specimen is clamped a piece of 20-mesh Bunsen burner gauze about 10 cm. (4 in.) square, in a horizontal position 1 cm. (⅜ in.) below the edge of the specimen, and with about 1.3 cm. (½ in.) of the specimen extending beyond the edge of the gauze. Any material remaining on the screen from the previous test is burned off or a new screen is used for each test.

A standard 1-cm. (⅜ in.)-diameter Bunsen burner with air ports open is adjusted to produce a blue flame approximately 2.5 cm. (1 in.) high. For each attempt to ignite the specimen the burner is placed so that the tip of the flame contacts the end of the test specimen. At the end of 30 seconds the flame is removed and placed at least 45 cm. (18 in.) from the specimen to reduce the effects of drafts in the hood while the specimen is allowed to burn. If the polymer does not continue to burn after the first ignition, the burner is placed in contact with free end for a second period of 30 seconds immediately after the specimen ceases to burn. The burner flame is extinguished after the second application and the hood closed for the remainder of the test. The extent of burning along the lower edge of the test specimen is determined as follows: If the specimen does not ignite on two attempts, the result is judged to be "non-burning" by this test. If the specimen continues to burn after the first or second ignition, a stop watch is started when the flame along the lower edge reaches the mark 2.54 cm. (1 in.) from the free end. The time $t$ (in seconds) until the flame reaches the mark 10.2 cm. (4 in.) from the free end is measured. A specimen that burns to the 10.2 cm. (4 in.) mark is judged to be "burning" by this test, and its burning rate is equal to $457/t$ cm. per minute ($180/t$ in. per minute). If a specimen does not burn to the 10.2 cm. (4 in.) mark after the first or second ignition, it is judged to be "self-extinguishing" by this test, and 10.2 cm. (4 in.) minus the unburned length (in centimeters or inches) from the clamped end, measured along the lower edge, is its "extent of burning."

As can be seen from the following data, the esters of 1,4-diphosphonyl butene and their halogenated derivatives give flame-retard characteristics to polymers without adversely affecting the physical properties of the urethane foam. Similar tests and similar flame retardant results are achieved in other polymeric systems such as polyvinyl chloride, polyvinyl acetate, nitrocellulose, ethyl cellulose, cellulose acetate and polyamides.

FLAMMABILITY TEST

| Compound of example | Foam type | Percent Hal. | Percent P. | Flame exposure time (sec.) | Time to extinction (sec.) | Length burned 4″— unburned (inches) | ASTM class | Appearance*** |
|---|---|---|---|---|---|---|---|---|
| 1 | I-0* | 0 | 0 | 30 | 55 | 4.0 | Burning | BBA |
| 1 | I-20 | 0 | 1.7 | 30 | 80 | 5.7 | Self-extinguishing | BBA |
| 1 | I-50 | 0 | 3.8 | 30 | 95 | 3.2 | do | BBA |
| 1 | II-0* | 0 | 0 | 30 | 63 | 4.0 | Burning | BAA |
| 1 | II-10 | 0 | 1.8 | 30 | 102 | 3.6 | Self-extinguishing | BAA |
| 1 | II-20 | 0 | 3.3 | 30 | 98 | 3.1 | do | BAA |
| 3 | I-0* | 0 | 0 | 30 | 58 | 4.0 | Burning | BBA |
| 3 | I-20 | 3.0 | 1.2 | 30 | 85 | 1.2 | Self-extinguishing | BBA |
| 3 | II-0* | 0 | 0 | 30 | 68 | 3.95 | Burning | BAA |
| 3 | II-10 | 3.2 | 1.2 | ¹30 | | (**) | | BAA |
| 3 | II-10 | 3.2 | 1.2 | ²30 | 99 | 1.5 | Self-extinguishing | BAA |
| 3 | II-20 | 5.8 | 2.2 | ¹30 | | (**) | | BAA |
| 3 | II-20 | 5.8 | 2.0 | ²30 | 75 | 1.0 | do | BAA |
| 4 | I-0* | 0 | 0 | 30 | 64 | 4.0 | Burning | BBA |
| 4 | I-20 | 1.6 | 1.4 | 30 | 110 | 3.8 | Self-extinguishing | |
| 4 | I-20 | 1.6 | 1.4 | | | | | |
| 4 | II-0* | 0 | 0 | 50 | 72 | 4.0 | Burning | BBA |
| 4 | II-10 | 1.7 | 1.5 | ¹50 | 95 | 1.8 | Self-extinguishing | BBA |
| 4 | II-20 | 3.1 | 2.7 | ¹30 | 105 | 1.1 | do | BBA |
| 7 | I-0* | 0 | 0 | 30 | 58 | 4.0 | Burning | BBA |
| 7 | I-50 | 0 | 4.6 | 30 | 98 | 3.0 | Self-extinguishing | BBA |

TABLE—Continued

| Compound of example | Foam type | Percent Hal. | Percent P. | Flame exposure time (sec.) | Time to extinction (sec.) | Length burned 4"— unburned (inches) | ASTM class | Appearance*** |
|---|---|---|---|---|---|---|---|---|
| 7 | I-50 | 0 | | | | | | |
| 7 | II-0* | 0 | 0 | 30 | 64 | 4.0 | Burning | BAA |
| 7 | II-20 | 0 | 4.0 | 30 | 98 | 2.8 | Self-extinguishing | BAA |
| 9 | I-0* | 0 | 0 | 30 | 51 | 4.0 | Burning | BBA |
| 9 | I-50 | 4.1 | 3.6 | 30 | 80 | 1.6 | Self-extinguishing | BBA |
| 9 | II-0* | 0 | 0 | 30 | 71 | 4.0 | Burning | BBA |
| 9 | II-20 | 3.6 | 3.2 | 30 | 99 | 0.9 | Self-extinguishing | BBA |
| 10 | I-0* | 0 | 0 | 30 | 59 | 4.0 | Burning | BBA |
| 10 | I-20 | 2.04 | 0.8 | 30 | 105 | 2.6 | Self-extinguishing | BBA |
| 10 | II-0* | 0 | 0 | 30 | 69 | 4.0 | Burning | BAA |
| 10 | II-20 | 4.0 | 1.5 | ¹30 | | | | BAA |
| 10 | II-20 | 4.0 | 1.7 | ²30 | 70 | 1.0 | Self-extinguishing | BAA |
| 11 | II-0* | 0 | 0 | 30 | 71 | 4.0 | Burning | BAA |
| 11 | II-20 | 0 | 1.6 | 30 | 102 | 3.3 | Self-extinguishing | |
| 14 | I-0* | 0 | 0 | 30 | 66 | 4.0 | Burning | BBA |
| 14 | I-20 | 2.1 | 0.8 | 30 | 105 | 2.6 | Self-extinguishing | BBA |
| 14 | II-0* | 0 | 0 | 30 | 68 | 4.0 | Burning | BAA |
| 14 | II-10 | 2.3 | 0.9 | 30 | 52 | 0.5 | Self-extinguishing | BAA |
| 14 | II-20 | 4.7 | 1.6 | ¹30 | | | | BAA |
| 14 | II-20 | 4.2 | 1.6 | ²30 | 78 | 1.2 | Self-extinguishing | BAA |
| 26 | I-0* | 0 | 0 | 30 | 61 | 4.0 | Burning | BBA |
| 26 | I-20 | | 1.9 | 30 | 92 | 4.0 | do | BBA |
| 26 | I-50 | | 4.1 | 30 | 100 | 3.3 | Self-extinguishing | BBA |
| 26 | II-0* | 0 | 0 | 30 | 68 | 4.0 | Burning | BAA |
| 26 | II-10 | | 1.9 | 30 | 96 | 3.6 | Self-extinguishing | BAA |
| 26 | II-20 | | 3.7 | 30 | 101 | 2.9 | do | BAA |
| 27 | II-0* | 0 | 0 | 30 | 72 | 4.0 | Burning | BAA |
| 27 | II-20 | 6.2 | 2.4 | ¹30 | | | | BAA |
| 27 | II-20 | 6.2 | 2.4 | ²30 | 68 | 0.8 | Self-extinguishing | BAA |
| 28 | II-0* | 0 | 0 | 30 | 75 | 4.0 | Burning | BAA |
| 28 | II-0* | 0 | 0 | 30 | 75 | 4.0 | do | BAA |
| 28 | II-10 | 4.2 | 0.8 | ¹30 | | | | BAA |
| 28 | II-10 | 4.2 | 0.8 | ²30 | 100 | 1.6 | Self-extinguishing | BAA |
| 28 | II-20 | 7.7 | 1.5 | ¹30 | | | | BAA |
| 28 | II-20 | 7.7 | 1.5 | ²30 | | | Non-burning | BAA |

¹ First.
² Second.
* 0% (control) compound.
** Burned area not measured.
*** The appearance of the foam is rated by a three-letter code with the first letter estimating the average cell size, the second letter uniformity of cell size and the third letter bulk flaws (splits, ridges, burns, piting, etc.) where—1st letter: A=Fine; B=Medium; C=Large—2d letter: A=Good; B=Fair; C=Poor—3d letter: A=None; B=Minor; C=Severe.

While this invention has been set forth in the above description and examples, it should be realized that in its broadest aspects, the invention is not so limited. Many other modifications will become apparent to those skilled in the art and these are also considered within the scope of this invention, as are equivalents which may be substituted therein.

What is claimed is:

1. A method of making esters of 1,4-diphosphonyl butene having the formula:

$$\begin{array}{c} R_1O \quad O \quad X \quad X \quad O \quad OR_3 \\ \diagdown \| \quad | \quad | \quad \| \diagup \\ P\,CH_2CHCHCH_2\,P \\ \diagup \qquad\qquad\qquad \diagdown \\ R_2O \qquad\qquad\qquad\quad OR_4 \end{array}$$

comprising the steps of:
  (1) reacting a tri-organo phosphite having the formula:

$$P\begin{array}{c}-OR_{1,2,3\text{ or }4}\\-OC_{1,2,3\text{ or }4}\\-OR_{1,2,3\text{ or }4}\end{array}$$

with a substantially equal molar portion of dihalo butenes selected from the group having the formulae:

$$CH=CHCH-CH_2 \text{ and } XCH_2CH=CHCH_2X$$
$$\qquad\quad |\quad\;|$$
$$\qquad\;\; X\;\;X \qquad \text{1,4-dihalo-2-butene}$$
3,4-dihalo-1-butene wherein $R_1$, $R_2$, $R_3$ and $R_4$ are selected from the group consisting of alkyl having 1 to 20 carbon atoms, aryl having 6 to 25 carbon atoms, cycloalkyl having 3 to 15 carbon atoms and wherein X is selected from the group consisting of hydrogen, chlorine and bromine, to give said esters of 1,4-phosphonyl butene and organo halide by-products and then:

(2) halogenating the product formed from step (1) with a halogen selected from the group consisting of chlorine and bromine.

2. The process of Claim 1 wherein $R_1$, $R_2$, $R_3$, and $R_4$ are the same.

3. The process of Claim 1 wherein $R_1$, $R_2$, $R_3$, and $R_4$ differ from each other.

4. The process of Claim 1 wherein the substituents are selected from the group consisting of halogen, cyano, nitro and methoxy.

5. The process of Claim 1 wherein the halogens are selected from the group consisting of bromine and chlorine.

6. The process of Claim 1 wherein step (1) is carried out at a temperature of not greater than 300° C. and under such conditions as to remove said by-products from the reaction zone as they are formed.

7. The process of Claim 1 wherein the halogenation step (2) is carried out at a temperature of not greater than 100° C.

8. The process of Claim 1 wherein said reactions (1) and (2) are carried out in the presence of an inert organic liquid diluent.

References Cited

UNITED STATES PATENTS

| | | | |
|---|---|---|---|
| 2,971,019 | 2/1961 | Ladd et al. | 260—932 X |
| 3,284,540 | 11/1966 | D'Alelio | 260—932 X |
| 3,463,837 | 8/1969 | Friedman | 260—932 X |

ANTON H. SUTTO, Primary Examiner

U.S. Cl. X.R.

106—15 FP; 260—2.5 AJ, 45.7 P, 234 R, 502.4 P, 929, 956, 958, 967, 969, 970, 986